UNITED STATES PATENT OFFICE.

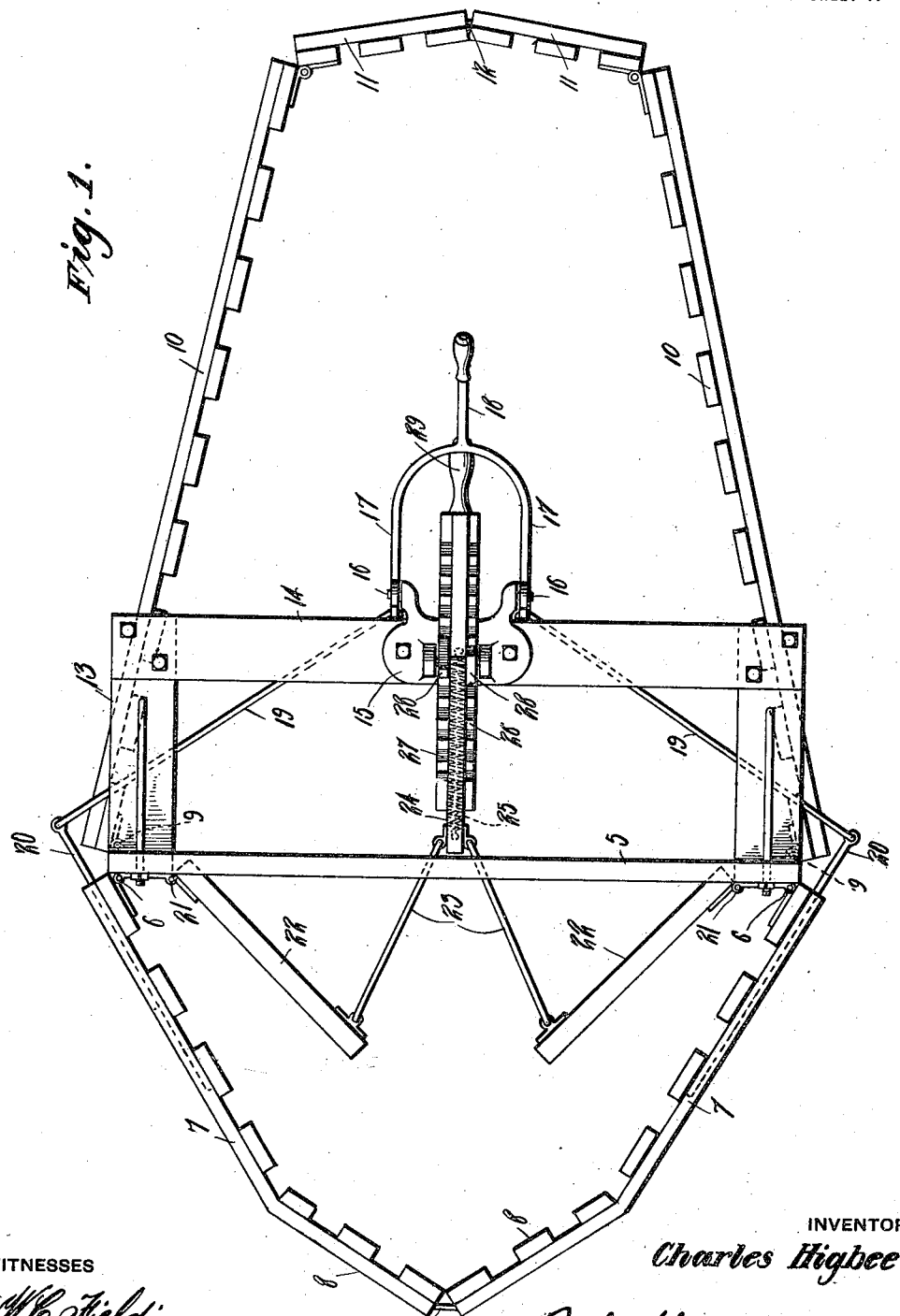

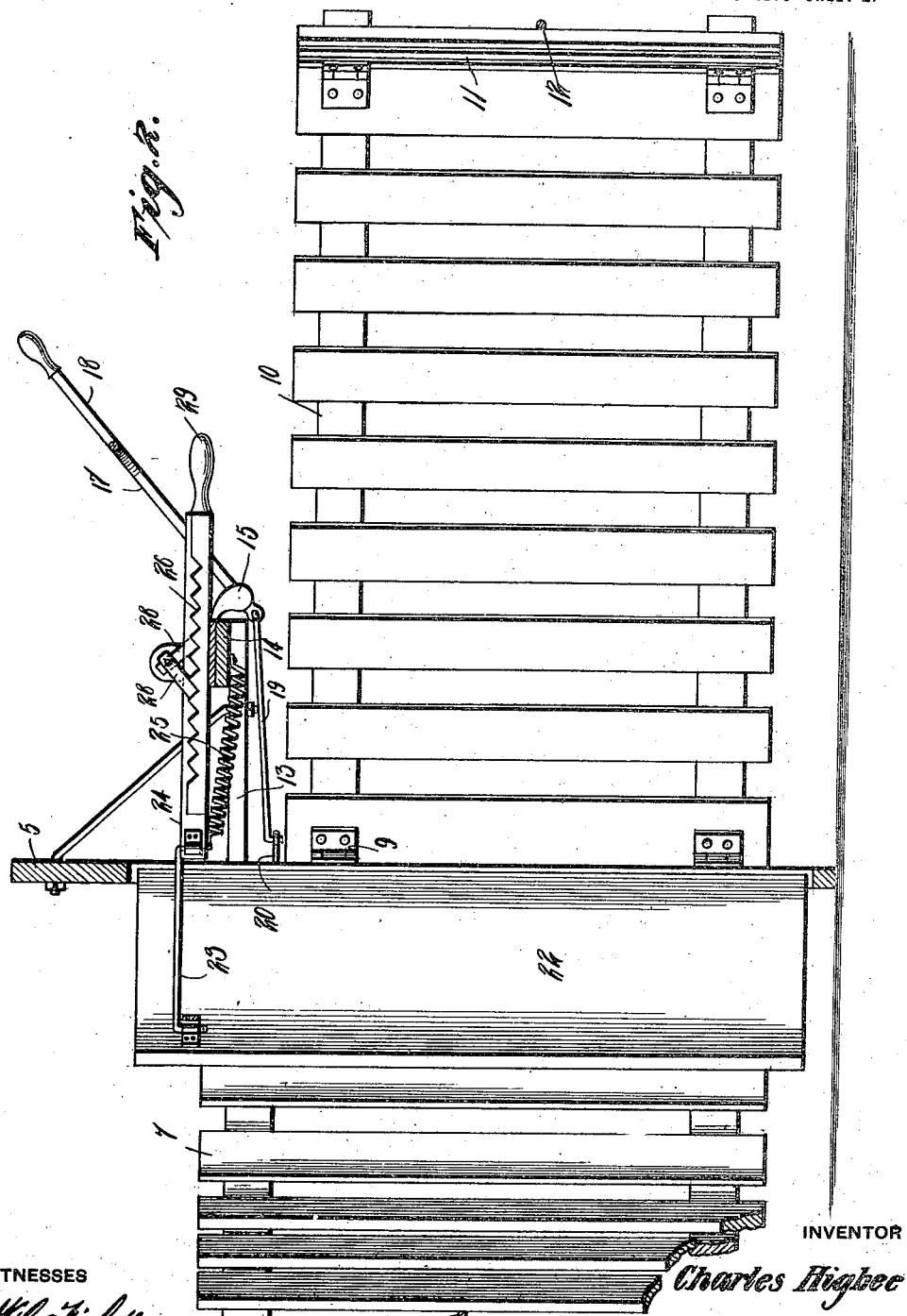

CHARLES HIGBEE, OF KIRKWOOD, ILLINOIS.

HOG-TRAP.

1,243,838.  Specification of Letters Patent.  Patented Oct. 23, 1917.

Application filed October 19, 1916. Serial No. 126,578.

*To all whom it may concern:*

Be it known that I, CHARLES HIGBEE, a citizen of the United States, residing at Kirkwood, in the county of Warren and State of Illinois, have invented certain new and useful Improvements in Hog-Traps, of which the following is a specification.

This invention relates to animal traps, and particularly to devices for confining hogs.

The invention aims primarily to provide improvements in means for trapping hogs, and embodies a cage-like structure within which the animal may enter, and which is equipped with improved means for opening and closing the cage. Further objects consist in providing a device of this character which is of simple construction; which is featured by the lack of intricate and complicated mechanisms; which is easy and simple in operation; and which will prove thoroughly practical in operation.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a top plan view of the trap with the parts in the position they would assume when the animal is confined; and Fig. 2 is a longitudinal sectional view taken through the improved trap.

Referring now more particularly to the drawings, 5 indicates a frame, which may be of any preferred height and width, and which is preferably constructed so as to be rectangular in shape.

Hinged as at 6 to the vertical members or stiles of the frame are front gates 7, the said gates having their free extremities inclined slightly inwardly as at 8, and the said gates being adapted when swung upon their hinges to closed position to meet at their free ends in advance of the frame. The gates in the present instance are of the paling type as shown. However, the type and size of the gates may be varied when required.

Hinged as at 9 to the vertical stiles of the frame and upon the rear faces thereof, are rear gates 10, the latter being similar in type and construction to the forwardly extending gates 7. The rear gates 10 are preferably longer than the front gates, and have hinged supplemental gate sections 11 at their extremities. These gate sections are capable of swinging into open or closed position upon the extremities of the rear gates 10, and, as illustrated in Fig. 1, the said rear gates and sections are capable of forming a pen-like structure for confining an animal. Conventional latches or other fasteners 12 are arranged upon the extremities of the front gates and of the supplemental gate sections so as to hold the same in closed position.

From this construction, it is apparent that when the various gates have been swung upon their hinges to closed position, a pen or cage is provided, and within which an animal, such as a hog, may be confined. The palings on the gates are preferably so closely arranged as to prevent the escape of smaller animals, such as pigs. The trap or cage in its entirety is of such size as will contain preferably a single animal, in order that the same may be readily shackled or tied, however, it is obvious that the trap may be constructed larger if desired.

Extending rearwardly from the frame 5 and adjacent the upper end thereof are arms 13, one of said arms projecting from each side of the frame 5, and the said arms are connected at their rearmost ends by a laterally extending beam or support 14. Mounted at the medial portion of the support 14 is a casting 15, which provides rearwardly extending trunnions 16, upon which are pivotally mounted the arms 17 of the lever 18. The lever is yoke shaped as shown, and to the extremities of its arms 17 are secured divergent links 19, the ends of which are attached to eye-bolts 20 projecting rearwardly from the front gates 7. This construction enables the front gates to be easily swung to open or closed position by an attendant from his position by the frame.

Hinged as at 21 to the vertical stiles of the frame 5, are doors 22. These doors when in closed position, form a barrier between the vertical stiles, and prevent passage of animals from the rear to the front side of the frame. Each gate is provided with a rearwardly extending link 23, the latter being secured to the forward end of a bar 24, and the said bar being mounted for sliding movement longitudinally of the pen within a bracket formed upon the casting 15. A contractile spring 25 connects the forward end of the bar with the beam 14, so as to normally hold the bar retracted and the door 22 in closed position. The bar 24 is provided with longitudinally arranged series of rack teeth 26 and 27, the latter being arranged adjacent the lateral edges of the said bar, and the teeth of one series are disposed opposite to the teeth of the other series. Pawls 28 are pivoted upon the casting 15, and are adapted to engage in the teeth of the series 26 and 27. These pawls are capable of being swung to operative or inoperative position upon their respective rack series; and when the pawls are set in the position indicated in Figs. 1 and 2, the bar 24 will be held against sliding movement either forwardly or rearwardly of the pen. The rearmost end of the bar 24 is provided with a handle 29 to form a convenient grip for the operator of the trap.

In operation, the doors 22 are set so that their free ends are spaced apart a distance slightly less than the width of the animal to be caught. The pawls are then set in the position shown in the drawings, so that the doors are locked. The front gates 7 are then closed, while the rear gates are open. The trap thus set is to be arranged in the door or alley way, or other narrow space into which the animals may be driven. After the animal has entered the trap, the supplemental gate section will be swung to closed position and latched. The animal is thus confined within the pen, and the pawl 28 which holds the bar 24 against rearward movement may be raised, whereupon the doors 22 will instantly swing to closed position. The animal will then be confined within the space between the frame 5 and the supplemental gate sections, and should the animal push against the doors 22, the same will not open, by reason of the pawl engaging with the teeth of the rack 27 to prevent forward sliding movement of the bar 24. The animal may then be easily caught and shackled, after which the trap will be again set.

From the foregoing description, it is apparent that I have provided an extremely simple and thoroughly efficient trap. The trap may be very inexpensively constructed, and the parts are so assembled and correlated as to obviate the possibility of wear, breakage or derangement.

While the present disclosure is that of what I believe to be the preferred embodiment of the invention, it is to be understood that the invention is not limited thereto, but that various changes may be made in the construction, arrangement and proportion of parts, without departing from the scope of the invention, as defined in the appended claim.

What is claimed is:—

In an animal trap, a frame, gates arranged in pairs and hinged to said frame and extending forwardly and rearwardly from the same, the ends of said gates being alined with the central portion of said frame when said gates are in closed position, and means on said frame for opening or closing one pair of said gates.

In testimony whereof I affix my signature in presence of two witnesses.

CHARLES HIGBEE.

Witnesses:
J. J. McNAMARA,
NELLE McNAMARA.

Copies of this patent may be obtained for five cents each, by addressing the "Commissioner of Patents, Washington, D. C."